3,068,179
METHOD AND APPARATUS FOR DISSEMINATING LIQUIDS FROM AIRCRAFT
Carl D. Farnsworth, Park Ridge, N.J., and Robert B. Wheeler, Aberdeen, Md., assignors to the United States of America as represented by the Secretary of the Army
Filed June 25, 1959, Ser. No. 822,981
3 Claims. (Cl. 252—305)
(Granted under Title 35, U.S. Code (1952), sec. 266)

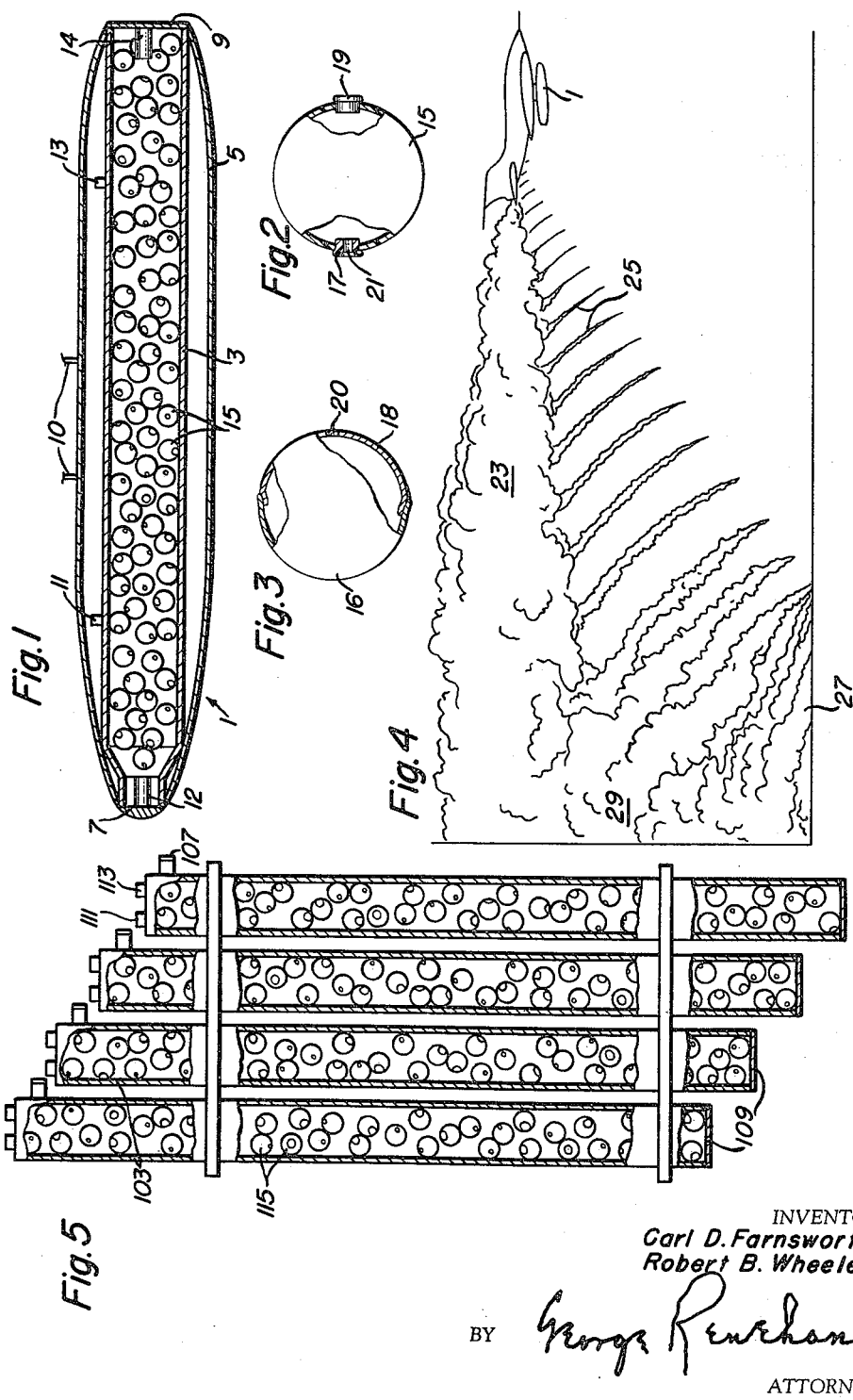

The invention herein described may be manufactured and used by or for the Government of the United States of America for governmental purposes without the payment to us of any royalty thereon.

This invention relates to a method and apparatus for disseminating liquid from aircraft in such a manner as to form a vertical curtain. It is primarily intended for the formation of a "smoke" curtain for military screening purposes, but is not limited to that particular application.

In the drawing,

FIG. 1 is a longitudinal section of a spray tank adapted for use on airplanes.

FIG. 2 is a section of one form of container 15 employed in the apparatus shown in FIGS. 1 and 5.

FIG. 3 is a section of another form of container 15.

FIG. 4 is a pictorial view showing the formation of the curtain by the apparatus of FIG. 1.

FIG. 5 is a sectional view of a dissemination system adapted for use on helicopters.

The system which we have devised comprises a tank which is adapted to be carried on an airplane or helicopter. Different types of tanks are employed depending on the type of aircraft. The tank is filled with loose hollow bodies or containers so shaped as to leave voids between them. Ordinarily these hollow bodies are spheres a few inches in diameter. Each container is provided with an aperture, different sized apertures being provided in different containers. The tank is closed and evacuated and a liquid agent is allowed to flow in, filling the hollow bodies and also the voids between them. The tank is carried aloft by the aircraft and the contents are released. The liquid in the voids is disseminated into the air at the level of the aircraft while the hollow bodies and their contents fall to the ground. Some of the hollow bodies have relatively large openings so that the liquid is released during fall. The remaining containers have openings so small that no substantial amount is released at this stage. They are, however, so constructed that the liquid is released on impact with the ground. If, as is the case in the usual application of our system, the liquid is one which forms a "smoke" on contact with the air, the liquid in the voids forms a cloud at the level of the aircraft, the liquid released on impact with the ground forms a low-level cloud, while the liquid released during fall forms a curtain joining the two clouds previously mentioned.

FIGURE 1 shows a tank 1 which is adapted to use on an airplane. It comprises a substantially cylindrical tank 3 which is enclosed in a streamlined fairing 5. Tank 3 is provided with an air inlet closure 7 at the forward end (as carried on the airplane) and an agent discharge closure 9 which is at the rear end. The container 3 also carries filling plugs 11, 13. The fairing 5 is provided with hangers 10 for suspending the tank beneath the wing of an airplane, and access openings (not shown) which allow access to plugs 11, 13. The tank is filled with hollow bodies 15.

One form of the hollow bodies 15 is shown in FIG. 2. It is a spherical member provided with plugs 17, 19 one of which has an opening 21. Alternatively, each body 15 may be made of two telescoping hemispheres, 16, 18 one of which is provided with an opening 20, as shown in FIG. 3. Various materials of construction may be used. Thus, polyethylene is very satisfactory when antimony trichloride is employed as the agent, but is unsatisfactory with mixtures of sulfur trioxide and chlorosulfonic acid. Aluminum is satisfactory for use with both of these agents.

The containers 15 may, moreover, be made of glass or frangible plastics, so that they will shatter when they strike the ground.

Operation of this embodiment is as follows. With closures 7 and 9 in position, one of the plugs, say 11, is connected to a vacuum pump while the plug 13 is connected to a supply of liquid. The tank is then evacuated. Next, liquid is admitted through plug 13, filling the container 3 and also filling the interiors of hollow bodies 15.

The tank is provided with any suitable means for destroying or quickly removing closures 7 and 9. For example electrically actuated detonators 12, 14 may be provided on the inside surfaces of each closure. The tank is mounted on an airplane as shown in FIG. 4. When it is desired to form the smoke curtain, closures 7 and 9 are blown off. Air rushes in at the forward end of the tank blowing contents out the rear end. The liquid in the voids forms a cloud indicated at 23 in FIG. 4. Some of the containers 15 have openings 21 or 20 approximately ½ inch in diameter. As these containers fall they form streamers 25. In other containers openings 21 are only about ⅛ inch in diameter. No substantial amount of liquid is discharged from these hollow bodies during fall, but on impact with the ground the plugs 17, 19 fly out or hemispheres 16, 18 separate, and the liquid is released as shown at 27 in FIG. 4. The clouds 23 and 27 blend with the streamers 25 as shown at 29 to form a vertical curtain extending from ground level to somewhat above altitude of the airplane. The entire process of forming a curtain, about 300 feet high and 1200 feet long, takes place in a very short time, usually, less than 30 seconds.

FIGURE 5 shows a variation of the system adapted for use in helicopters. This is made up of a plurality of tubes 103, each of which is filled with hollow bodies or containers 115 of the same type as members 15 of FIG. 1. Each tube 103 is equipped with an air inlet closure 107 and with access plugs 111, 113. At the bottom of each tube is an agent discharge closure 109.

The mode of operation of this embodiment is virtually the same as that of the modification of FIG. 1. After the tube and its enclosed containers have been evacuated and filled by suitable connections to plugs 111, 113, the assembly is carried aloft and closures 107 and 109 are blown off or otherwise removed. Because of the relatively slow forward speed of the helicopters it is desirable to employ a bank of tubes 103, as shown, so that they may be released in succession to provide proper distribution of the material.

The liquid agent normally employed will be one which forms a fog or smoke on contact with the atmosphere. One suitable agent is the mixture of sulfur trioxide and chlorosulfonic acid designated FS by the U.S. Army. Other agents such as titanium tetrachloride (FM) which function in a similar manner may be used. In some situations it may be desirable to distribute a toxic or insecticidal agent rather than a smoke agent in this manner. The specific apparatus may be suitably varied from that shown so long as it functions in the same basic manner.

As is apparent from the above description our method involves discharging simultaneously from a moving aircraft (a) free liquid, (b) hollow bodies filled with liquid and so constructed as to discharge their liquid content during fall, and (c) hollow bodies filled with liquid so constructed that they do not release their liquid content during fall but release it on impact with the ground. These three categories, or any combination of them, might be in separate tanks rather than all being in a single tank. For example, some tanks might be filled with spheres having ⅛ in. apertures and others with spheres having ½ in. apertures and different numbers of tanks of each kind employed depending on the particular conditions.

The apparatus described, however, represents our preferred means for carrying out our method.

Since, as pointed out above, considerable variation is possible from the specific embodiment described, we wish our invention to be limited solely by the scope of the appended claims.

We claim:

1. A method of producing a vertical curtain of disseminated liquid which comprises discharging simultaneously from a moving aircraft (a) free liquid, (b) hollow bodies filled with liquid and so constructed as to discharge their liquid content during fall, and (c) hollow bodies filled with liquid and so constructed that they do not release substantial quantities of liquid during fall, but release their liquid content on impact with the ground.

2. A method as defined in claim 1 wherein said liquid is one which forms a screening smoke on contact with the air.

3. A method as defined in claim 2 wherein said liquid is selected from the class consisting of titanium tetrachloride and mixtures of sulfur trioxide and chlorosulfonic acid.

References Cited in the file of this patent
UNITED STATES PATENTS

| | | |
|---|---|---|
| 1,503,830 | Hineman | Aug. 5, 1924 |
| 1,716,794 | Remey | June 11, 1929 |
| 1,716,795 | Remey | June 11, 1929 |
| 1,850,635 | Reed | Mar. 22, 1932 |
| 1,912,392 | Wilkins | June 6, 1933 |
| 2,062,511 | Haddock et al. | Dec. 1, 1936 |
| 2,408,774 | Goddard et al. | Oct. 8, 1946 |